(12) United States Patent
Hayashi

(10) Patent No.: US 10,664,712 B2
(45) Date of Patent: May 26, 2020

(54) EYELID OPENING/CLOSING DETERMINATION APPARATUS AND DROWSINESS DETECTION APPARATUS

(71) Applicant: ALPINE ELECTRONICS, INC., Ota-ku, Tokyo (JP)

(72) Inventor: Shuhei Hayashi, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 133 days.

(21) Appl. No.: 16/152,073

(22) Filed: Oct. 4, 2018

(65) Prior Publication Data

US 2019/0147268 A1 May 16, 2019

(30) Foreign Application Priority Data

Nov. 10, 2017 (JP) ................................. 2017-216842

(51) Int. Cl.
*G06K 9/00* (2006.01)

(52) U.S. Cl.
CPC ....... *G06K 9/00845* (2013.01); *G06K 9/0061* (2013.01); *G06K 9/00362* (2013.01)

(58) Field of Classification Search
CPC .......... G06K 9/00845; G06K 9/00624; G06K 9/00832; G06K 9/00362; G06K 9/00597; G06K 9/0061
USPC ........ 382/100, 103, 107, 115, 116, 117, 118, 382/128, 162, 168, 181, 190, 203, 224, 382/232, 254, 266, 274, 275, 276, 305, 382/312; 348/61, 77, 78; 351/200, 205, 351/209
See application file for complete search history.

(56) References Cited

U.S. PATENT DOCUMENTS

| | | | | |
|---|---|---|---|---|
| 7,916,904 B2* | 3/2011 | Suzuki | ............... | G06K 9/00281 351/206 |
| 7,948,387 B2* | 5/2011 | Ishida | ................ | G08B 21/06 340/575 |
| 8,154,591 B2* | 4/2012 | Morita | ............... | G06K 9/00248 348/73 |
| 10,095,936 B2* | 10/2018 | Ohya | ................ | G06K 9/0061 |
| 10,445,574 B2* | 10/2019 | Odinokikh | ......... | G06K 9/00604 |

FOREIGN PATENT DOCUMENTS

JP 2008-171065 7/2008

* cited by examiner

*Primary Examiner* — Sheela C Chawan
(74) *Attorney, Agent, or Firm* — Brinks Gilson & Lione

(57) ABSTRACT

A drowsiness detection apparatus includes a camera that images a face of a user, an opening/closing-degree calculation unit that calculates an eyelid opening/closing degree based on a face image acquired by the imaging, a face-angle detection unit that detects a face angle based on the face image, a distance calculation unit that calculates the distance between an eyelid and an eyebrow based on the face image, an opening/closing-degree correction unit that corrects the eyelid opening/closing degree based on the detected face angle and the calculated distance between the eyelid and eyebrow, and an eyelid-opening/closing determination unit that determines whether the eyelids are opened or closed by comparing the eyelid opening/closing degree with a predetermined threshold value.

20 Claims, 3 Drawing Sheets

EYELID OPENING/CLOSING DETERMINATION APPARATUS AND DROWSINESS DETECTION APPARATUS

RELATED APPLICATION

The present application claims priority to Japanese Patent Application Number 2017-216842, filed Nov. 10, 2017, the entirety of which is hereby incorporated by reference.

BACKGROUND

1. Field of the Invention

The present invention relates to an eyelid opening/closing determination apparatus and a drowsiness detection apparatus which detect an eyelid opening/closing state of a driver with a camera mounted in a vehicle.

2. Description of the Related Art

There is known a conventional drowsiness detection apparatus that calculates the awakening degree of a driver driving a vehicle by imaging an eye area of the driver with a camera and detecting blinking based on the eye opening degree, and estimates the drowsiness degree of the driver (for example, see JP 2008-171065 A). This apparatus corrects and cancels, by performing a downward-glance determination, deterioration of the actual awakening degree of the driver caused by a downward glance which is when the driver is looking at a gauge or the like at a lower side.

The drowsiness detection apparatus disclosed in JP 2008-171065 A calculates the distance between the highest point of an upper eyelid and the lowest point of a lower eyelid as an eyelid opening degree with a camera. However, in the case of a driver facing downward, that is, a downward glance or the like, the difference between the opening degrees when the eyelids are opened and closed is small, which makes it difficult to determine whether the eyelids are opened or closed, and erroneous determination of an eyelid opening/closing state is easily caused. This erroneous determination also affects the calculation of the awakening degree of the driver and the estimation of drowsiness thereafter. Furthermore, in JP 2008-171065 A, although the awakening degree is corrected taking a downward glance into consideration, the influence of the erroneous determination of an eyelid opening/closing state cannot be corrected, and it is desired to increase the determination accuracy of an opening/closing state.

SUMMARY

The present disclosure has been made in view of the above problems, and a purpose of the present disclosure is to provide an eyelid opening/closing determination apparatus and a drowsiness detection apparatus capable of increasing the determination accuracy of an eyelid opening/closing state of a user (driver).

In order to solve the above problems, an eyelid opening/closing determination apparatus in an embodiment of the present invention includes an imager for imaging a face of a user, an opening/closing-degree calculator for calculating an eyelid opening/closing degree based on a face image acquired by the imager, a face-angle detector for detecting a face angle based on the face image, a distance calculator for calculating a distance between an eyelid and an eyebrow based on the face image, an eyelid-opening/closing determiner for determining whether the eyelids are opened or closed by comparing the eyelid opening/closing degree with a predetermined threshold value, and an opening/closing-degree corrector for correcting the eyelid opening/closing degree based on the face angle detected by the face-angle detector and the distance calculated by the distance calculator.

Although it is difficult to confirm an eyelid opening/closing state in the case of a driver's face facing downward, by correcting the eyelid opening/closing degree based on the distance between the eyelid and the eyebrow, it is possible to increase the determination accuracy of the eyelid opening/closing state.

It is preferable that the opening/closing-degree corrector corrects the eyelid opening/closing degree to a larger value when a face direction determined based on the face angle is downward from a first reference and the distance calculated by the distance calculator is less than a second reference. Accordingly, it is possible to reliably determine the opening state of the eyelids in the case of the face facing downward.

It is preferable that the opening/closing-degree corrector changes the second reference based on the face angle. By taking into consideration the fact that the distance between the eyelid and the eyebrow changes due to the face angle, it is possible to further increase the determination accuracy of the eyelid opening/closing state.

It is preferable that the opening/closing-degree calculator calculates a value of a width between an upper eyelid and a lower eyelid included in the face image as the eyelid opening/closing degree. By setting the value of the width of the upper eyelid and the lower eyelid as the eyelid opening/closing degree, it is possible to easily determine the eyelid opening/closing state.

A drowsiness detection apparatus in an embodiment of the present invention includes a drowsiness determiner for determining drowsiness of a user based on a determination result of the eyelid-opening/closing determiner. By increasing the determination accuracy of the eyelid opening/closing state, it is also possible to improve the determination accuracy of the user's drowsiness using the determination result.

DETAILED DESCRIPTION

Hereinafter, a drowsiness detection apparatus in an embodiment to which the present invention is applied is described with reference to the drawings.

Figure 1:
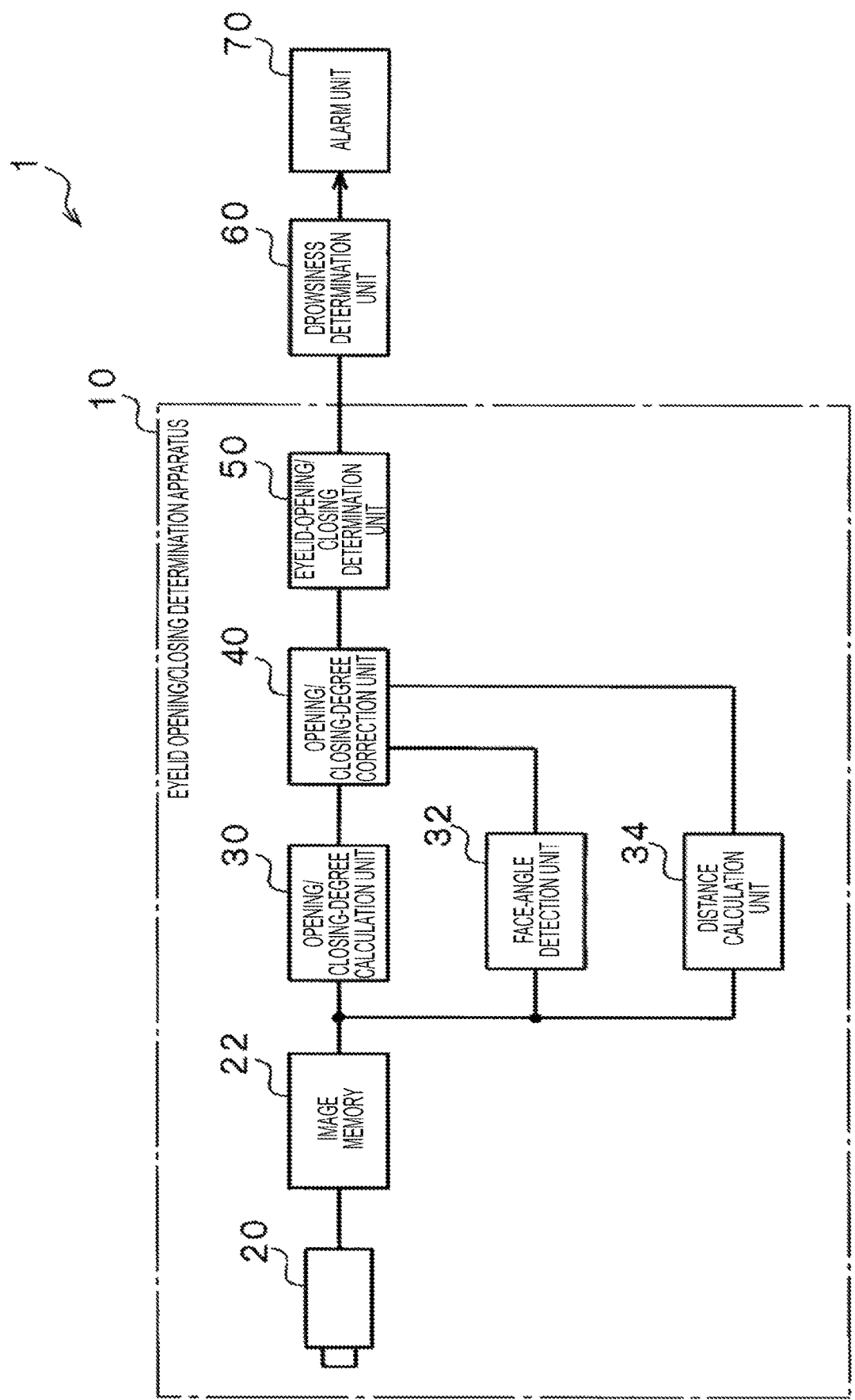
FIG. 1 is a diagram showing a configuration of a drowsiness detection apparatus in an embodiment.

FIG. 1 is a diagram showing a configuration of a drowsiness detection apparatus in an embodiment. As shown in FIG. 1, a drowsiness detection apparatus 1 in the present embodiment includes an eyelid opening/closing determination apparatus 10, a drowsiness determination unit 60, and an alarm unit 70. The drowsiness detection apparatus 1 is mounted in, for example, a vehicle, and performs a predetermined alarming operation to urge a driver as a user to awake when detecting drowsiness of the user.

The eyelid opening/closing determination apparatus 10 determines an eyelid opening/closing state of the driver (whether the eyelids are opened or closed). For this purpose, the eyelid opening/closing determination apparatus 10 includes a camera 20, an image memory 22, an opening/closing-degree calculation unit 30, a face-angle detection unit 32, a distance calculation unit 34, an opening/closing-degree correction unit 40, and an eyelid-opening/closing determination unit 50.

The camera 20 is disposed at a predetermined position in front of the driver and images a predetermined range including the face, in particular, the eyes and the eyebrows of the driver. The camera 20 is attached, for example, in the vicinity of the steering shaft, in the vicinity of the speedometer, on the dashboard, or the like, and images at least the eyes and eyebrows of the driver of a traveling vehicle. The image memory 22 stores face images acquired by the camera 20 at a predetermined frame rate (for example, 30 frames/second).

The opening/closing-degree calculation unit 30 calculates an eyelid opening/closing degree based on a face image acquired by the camera 20 and stored in the image memory 22. For example, the opening/closing-degree calculation unit 30 extracts the portion of an eye included in the face image and calculates the value of the width between the upper eyelid and the lower eyelid (the distance between the highest point of the upper eyelid contour shape and the lowest point of the lower eyelid contour shape in the vertical direction) as the eyelid opening/closing degree.

Figure 2:
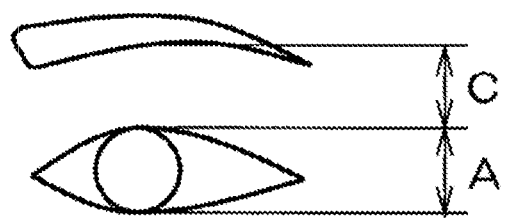
FIG. 2 is a diagram explaining calculation of an eyelid opening/closing degree.

FIG. 2 is a diagram explaining calculation of the eyelid opening/closing degree. As shown in FIG. 2, a distance A between the highest point of the upper eyelid contour line and the lowest point of the lower eyelid of an eye is calculated as an eyelid opening/closing degree A. Although the example in FIG. 2 shows the left eye, the eyelid opening/closing degree A of the right eye is similarly calculated.

The face-angle detection unit 32 detects a face angle based on a face image acquired by the camera 20 and stored in the image memory 22. For example, a face angle B is detected based on the contour line shape (uneven shape or the like) of the face parts (eyes, mouth, and the like) included in the face image.

The distance calculation unit 34 calculates the distance between an eyelid and an eyebrow based on a face image acquired by the camera 20 and stored in the image memory 22. For example, the distance calculation unit 34 calculates a distance C between the highest point of the upper eyelid contour shape included in the face image and the lower point of the eyebrow from the highest point in the vertical direction as the distance C between the eyelid and the eyebrow (see FIG. 2).

The opening/closing-degree correction unit 40 corrects, based on the face angle detected by the face-angle detection unit 32 and the distance C between the eyelid and the eyebrow calculated by the distance calculation unit 34, the value of the eyelid opening/closing degree A calculated by the opening/closing-degree calculation unit 30. Specifically, the opening/closing-degree correction unit 40 corrects the eyelid opening/closing degree A calculated by the opening/closing-degree calculation unit 30 to a large value when the face direction determined based on the face angle B is downward from a first reference and the distance C calculated by the distance calculation unit 34 is less than a second reference. For example, a correction process for setting the result obtained by adding a predetermined value a to the eyelid opening/closing degree A as a new eyelid opening/closing degree A is performed.

The eyelid-opening/closing determination unit 50 determines whether the eyelids are opened or closed by comparing the eyelid opening/closing degree A after the correction by the opening/closing-degree correction unit 40 with a predetermined threshold value A0.

The drowsiness determination unit 60 determines drowsiness of the user based on the determination result of the eyelid-opening/closing determination unit 50 in the eyelid opening/closing determination apparatus 10. For example, when the blinking time from the closing state to the eyelid opening state is long, the driver is determined as feeling drowsy.

The alarm unit 70 performs a predetermined alarm operation to the driver when the drowsiness determination unit 60 determines that the driver feels drowsy. For example, an alarm sound for urging awakening is output.

The camera 20 corresponds to an imager, the opening/closing-degree calculation unit 30 corresponds to an opening/closing-degree calculator, the face-angle detection unit 32 corresponds to a face-angle detector, the distance calculation unit 34 corresponds to a distance calculator, the eyelid-opening/closing determination unit 50 corresponds to an eyelid-opening/closing determiner, the opening/closing-degree correction unit 40 corresponds to an opening/closing-degree corrector, and the drowsiness determination unit 60 corresponds to a drowsiness determiner.

The drowsiness detection apparatus 1 in the present embodiment has such a configuration, and the operation thereof is described next.

Figure 3:
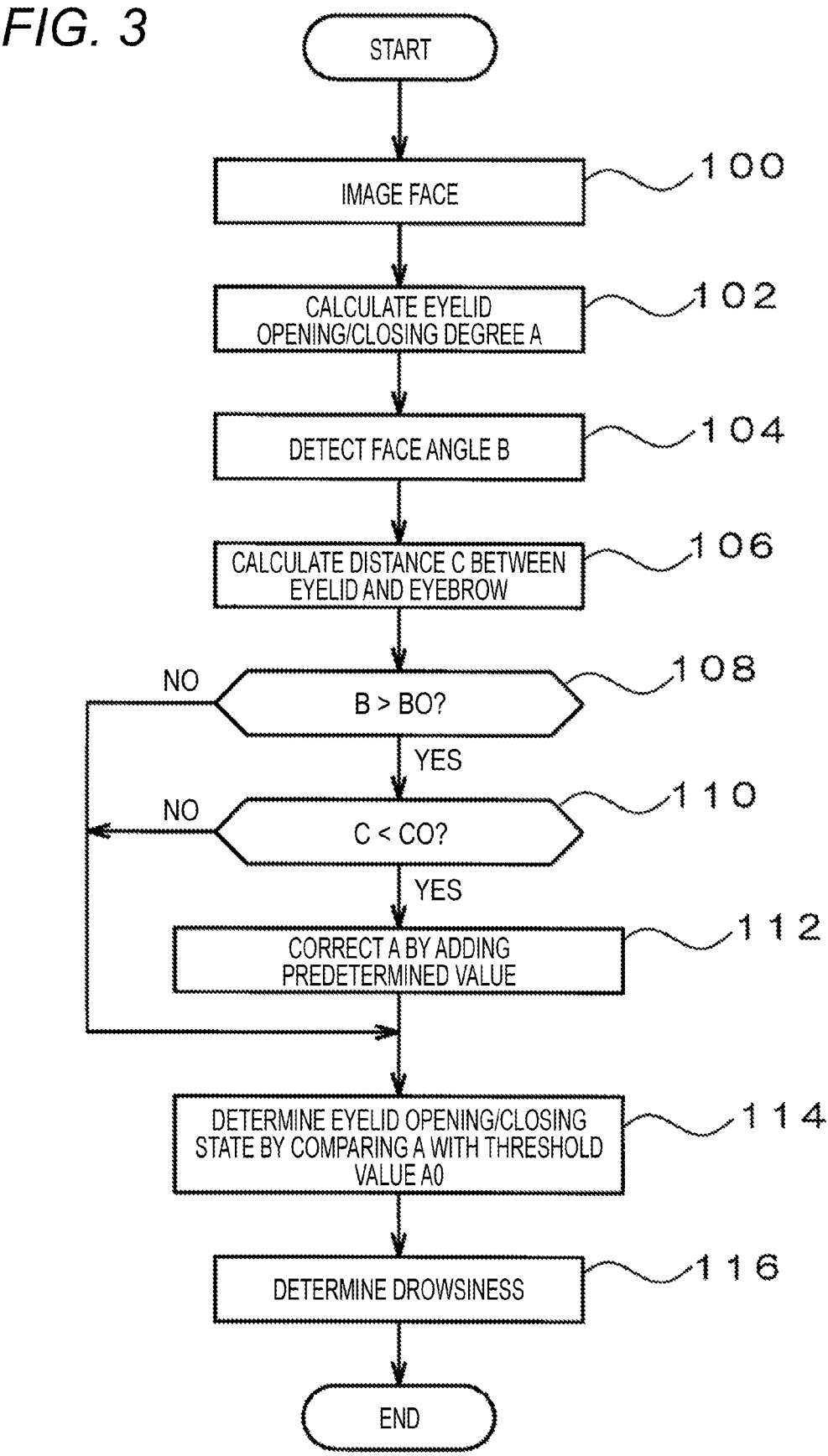
FIG. 3 is a flowchart showing an operation procedure for performing drowsiness determination based on an eyelid opening/closing state of a driver by imaging a face.

FIG. 3 is a flowchart of an operation procedure for performing drowsiness determination based on an eyelid opening/closing state of a driver by imaging a face.

When the face of the driver is imaged by the camera 20 and a face image is stored in the image memory 22 (step 100), the opening/closing-degree calculation unit 30 calculates an eyelid opening/closing degree A (FIG. 2) of the driver's eyes (step 102). For example, eyelid opening/closing degrees of the left and right eyes are calculated and the average value thereof is used as the eyelid opening/closing degree A.

Next, the face-angle detection unit 32 calculates a face angle B of the driver based on a face image stored in the image memory 22 (step 104). The distance calculation unit 34 calculates a distance C between an eyelid and an eyebrow (FIG. 2) of the driver's face based on a face image stored in the image memory 22 (step 106). The calculation of the eyelid opening/closing degree A, the face angle B, and the distance C between an eyelid and an eyebrow may be performed in a different order or in parallel.

Next, the opening/closing-degree correction unit 40 determines whether the face angle B is larger than a reference value B0 (step 108). This determination is to determine whether the face direction determined based on the face angle B (the face direction having the angle B) is downward from the first reference, and the determination expression B<B0 is used instead of the determination expression B>B0 depending on how to calculate the angle and how to set the reference value B0. When the face angle B is larger than the reference value B0 (B>B0), that is, the face direction of the driver is downward from the first reference (the driver is facing downward from an assumed direction), the determination is positive.

Next, the opening/closing-degree correction unit 40 determines whether the distance C between the eyelid and the eyebrow is smaller than a reference value C0 (step 110). This is to determine whether the distance between the eyelid and the eyebrow is less than the second reference as the eyelids are opened. When the distance C is less than the reference value C0 (C<C0), that is, the distance between the eyelid and the eyebrow becomes smaller, the determination is positive.

Next, the opening/closing-degree correction unit 40 performs a correction process for setting the result obtained by adding the predetermined value a to the eyelid opening/closing degree A as a new eyelid opening/closing degree A (step 112). Note that, when the determination is negative in step 108 (when the driver's face is not facing downward) or when the determination is negative in step 110 (when the distance between the eyelid and eyebrow does not become small), the processing for adding the predetermined value a to the eyelid opening/closing degree A is not performed.

Next, the eyelid-opening/closing determination unit 50 determines whether the eyelids are opened or closed by comparing the eyelid opening/closing degree A after the correction by the opening/closing-degree correction unit 40 with the predetermined threshold value A0 (step 114).

For example, in the case of the driver's face not facing downward, it is assumed that the average value of the eyelid opening/closing degree A when the eyelids are closed is 20, and the average value of the eyelid opening/closing degree A is 80 when the eyelids are opened. On the other hand, in the case of the driver's face facing downward, it is assumed that the average value of the eyelid opening/closing degree A when the eyelids are closed is 20, and the average value of the eyelid opening/closing degree A is 40 when the eyelids are opened. When it is assumed that the threshold value A0 is set to 50, it is possible to accurately determine the eyelid opening/closing state with the threshold value A0 in the case of the face not facing downward. However, in the case of the face facing downward, since the eyelid opening/closing degree A before correction is only 40 although the eyelids are opened, it is impossible to determine the eyelid opening/closing state with the threshold value A0. In the present embodiment, in the case of the face facing downward, when the distance between the eyelid and the eyebrow is small (when the eyelids are probably opened), the predetermined value a (for example, a=20) is added to the eyelid opening/closing degree A, and the eyelid opening/closing degree A after the correction becomes 60 when the eyelids are opened. Accordingly, it is possible to accurately determine the eyelid opening/closing state with the threshold value A0.

After the eyelid opening/closing state is determined in this manner, the drowsiness determination unit 60 determines drowsiness of the user based on the determination result (step 116). Then, as necessary, an alarming operation is performed to the user feeling drowsy by the alarm unit 70.

As described above, although it is difficult to confirm an eyelid opening/closing state in the case of the driver's face facing downward, by correcting an eyelid opening/closing degree based on the distance between the eyelid and the eyebrow, it is possible to increase the determination accuracy of an eyelid opening/closing state with the drowsiness detection apparatus 1 in the present embodiment.

In particular, by correcting an eyelid opening/closing degree to a large value when the face direction is downward from the first reference and the distance between the eyelid and the eyebrow is less than the second reference, it is possible to reliably determine the eyelid opening state in the case of the face facing downward. Furthermore, by calculating the value of the width between the upper eyelid and the lower eyelid included in a face image as the eyelid opening/closing degree, it is possible to easily determine an eyelid opening/closing state. As the determination accuracy of the eyelid opening/closing state is increased, it is also possible to improve the determination accuracy of the user's drowsiness using the determination result.

Note that, the present invention is not limited to the above embodiment, and various modifications can be made. For example, in the above embodiment, it has been described that the opening/closing-degree correction unit 40 corrects the eyelid opening/closing degree A when the distance C between the eyelid and the eyebrow is less than the second reference (when the distance C is smaller than the reference value C0 (C<C0) and the determination is positive in step 110 in FIG. 3). However, the reference value C0 as the second reference may be changed according to the face angle B detected by the face-angle detection unit 32. When the distance C between the eyelid and the eyebrow in the eyelid closing state becomes smaller as the face is facing further downward, it is desirable that the reference value C0 is changed to a smaller value accordingly. In this manner, by taking into consideration the fact that the distance between the eyelid and the eyebrow changes due to the face angle, it is possible to further increase the determination accuracy of an eyelid opening/closing state.

Furthermore, it has been described that the eyelid opening/closing state and drowsiness of a driver of a vehicle are determined in the above embodiment, but these determinations may be performed for users other than users driving vehicles.

As described above, according to the present disclosure, although it is difficult to confirm an eyelid opening/closing state in the case of a driver's face facing downward, by correcting an eyelid opening/closing degree based on the distance between the eyelid and the eyebrow, it is possible to increase the determination accuracy of an eyelid opening/closing state.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An eyelid opening/closing determination apparatus comprising:
    an imager for imaging a face of a user;
    an opening/closing-degree calculator for calculating an eyelid opening/closing degree based on a face image acquired by the imager;
    a face-angle detector for detecting a face angle based on the face image;
    a distance calculator for calculating a distance between an eyelid and an eyebrow based on the face image;
    an eyelid-opening/closing determiner for determining whether the eyelids are opened or closed by comparing the eyelid opening/closing degree with a predetermined threshold value; and
    an opening/closing-degree corrector for correcting the eyelid opening/closing degree based on the face angle detected by the face-angle detector and the distance calculated by the distance calculator.

2. The eyelid opening/closing determination apparatus according to claim 1, wherein the opening/closing-degree corrector corrects the eyelid opening/closing degree to a larger value when a face direction determined based on the face angle is downward from a first reference and the distance calculated by the distance calculator is less than a second reference.

3. The eyelid opening/closing determination apparatus according to claim 2, wherein the opening/closing-degree corrector changes the second reference based on the face angle.

4. The eyelid opening/closing determination apparatus according to claim 3, wherein the opening/closing-degree calculator calculates, as the eyelid opening/closing degree, a value of a width between an upper eyelid and a lower eyelid included in the face image.

5. A drowsiness detection apparatus comprising a drowsiness determiner for determining drowsiness of a user based on a determination result of the eyelid-opening/closing determination apparatus according to claim 4.

6. A drowsiness detection apparatus comprising a drowsiness determiner for determining drowsiness of a user based on a determination result of the eyelid-opening/closing determination apparatus according to claim 3.

7. The eyelid opening/closing determination apparatus according to claim 2, wherein the opening/closing-degree calculator calculates, as the eyelid opening/closing degree, a value of a width between an upper eyelid and a lower eyelid included in the face image.

8. The eyelid opening/closing determination apparatus according to claim 1, wherein the opening/closing-degree calculator calculates, as the eyelid opening/closing degree, a value of a width between an upper eyelid and a lower eyelid included in the face image.

9. A drowsiness detection apparatus comprising a drowsiness determiner for determining drowsiness of a user based on a determination result of the eyelid-opening/closing determination apparatus according to claim 8.

10. A drowsiness detection apparatus comprising a drowsiness determiner for determining drowsiness of a user based on a determination result of the eyelid-opening/closing determination apparatus according to claim 1.

11. An eyelid opening/closing determination method comprising:
    imaging a face of a user;
    calculating an eyelid opening/closing degree based on the face image;
    detecting a face angle based on the face image;
    calculating a distance between an eyelid and an eyebrow based on the face image;
    determining whether the eyelids are opened or closed by comparing the eyelid opening/closing degree with a predetermined threshold value; and
    correcting the eyelid opening/closing degree based on the detected face angle and the calculated distance.

12. The eyelid opening/closing determination method according to claim 11, wherein the opening/closing-degree correcting step corrects the eyelid opening/closing degree to a larger value when a face direction determined based on the face angle is downward from a first reference and the calculated distance is less than a second reference.

13. The eyelid opening/closing determination method according to claim 12, wherein the opening/closing-degree correcting step changes the second reference based on the face angle.

14. The eyelid opening/closing determination method according to claim 13, wherein the opening/closing-degree calculating step calculates, as the eyelid opening/closing degree, a value of a width between an upper eyelid and a lower eyelid included in the face image.

15. A drowsiness detection method comprising determining drowsiness of a user based on a determination result of the eyelid-opening/closing determination method according to claim 14.

16. A drowsiness detection method comprising determining drowsiness of a user based on a determination result of the eyelid-opening/closing determination method according to claim 13.

17. The eyelid opening/closing determination method according to claim 12, wherein the opening/closing-degree calculating step calculates, as the eyelid opening/closing degree, a value of a width between an upper eyelid and a lower eyelid included in the face image.

18. The eyelid opening/closing determination method according to claim 11, wherein the opening/closing-degree calculating step calculates, as the eyelid opening/closing degree, a value of a width between an upper eyelid and a lower eyelid included in the face image.

19. A drowsiness detection method comprising determining drowsiness of a user based on a determination result of the eyelid-opening/closing determination method according to claim 18.

20. A drowsiness detection method comprising determining drowsiness of a user based on a determination result of the eyelid-opening/closing determination method according to claim 11.

* * * * *